US012715272B2

(12) United States Patent
Bronstein

(10) Patent No.: US 12,715,272 B2
(45) Date of Patent: Aug. 25, 2026

(54) VEHICLE GLAZING ARRANGEMENT

(71) Applicant: Webasto SE, Stockdorf (DE)

(72) Inventor: Wladislaw Bronstein, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/919,062

(22) Filed: Oct. 17, 2024

(65) Prior Publication Data

US 2025/0135847 A1 May 1, 2025

(30) Foreign Application Priority Data

Oct. 31, 2023 (DE) ......................... 102023130053.9

(51) Int. Cl.

| | |
|---|---|
| ***B60J 1/00*** | (2006.01) |
| ***B32B 7/02*** | (2019.01) |
| ***B32B 17/10*** | (2006.01) |
| ***B60Q 3/62*** | (2017.01) |
| ***F21V 8/00*** | (2006.01) |

(Continued)

(52) U.S. Cl.

CPC ................. *B60J 1/001* (2013.01); *B32B 7/02* (2013.01); *B32B 17/10036* (2013.01); *B32B 17/10458* (2013.01); *B32B 17/10504* (2013.01); *B32B 17/10651* (2013.01); *B32B 17/10761* (2013.01); *B60Q 3/62* (2017.02); *G02B 6/0086* (2013.01); *G02F 1/1334* (2013.01); *G02F 1/133553* (2013.01); *B32B 2307/7376* (2023.05); *B32B 2605/00* (2013.01)

(58) Field of Classification Search

CPC ... B60J 1/001; B60Q 3/62; B32B 7/02; B32B 17/10036; B32B 17/10458

See application file for complete search history.

(56) References Cited

U.S. PATENT DOCUMENTS

| | | | |
|---|---|---|---|
| 2021/0016640 | A1 | 1/2021 | Manz |
| 2023/0202266 | A1 | 6/2023 | Sadakane |

FOREIGN PATENT DOCUMENTS

| | | | |
|---|---|---|---|
| CN | 215449817 | U | 1/2022 |
| DE | 1100282 | B | 2/1961 |

(Continued)

OTHER PUBLICATIONS

Office Action issued in corresponding German Application No. 10 2023 130 053.9; mailed Jun. 14 2024; In German with English machine translation (10pages).

*Primary Examiner* — Lucy P Chien

(74) *Attorney, Agent, or Firm* — Fitch, Even, Tabin & Flannery, LLP

(57) ABSTRACT

A glazing arrangement for a vehicle includes a first glazing element, a second glazing element, the second glazing element being coupled with the first glazing element. The glazing arrangement also includes a switchable interlayer, which is arranged in stacking direction between the first glazing element and the second glazing element, a first plastics layer having a first thickness along the stacking direction and a first pigment concentration, the first plastics layer being arranged between the first glazing element and the interlayer, and a second plastics layer having a second thickness along the stacking direction and a second pigment concentration, the second plastics layer being arranged between the second glazing element and the interlayer. The first pigment concentration is higher than the second pigment concentration.

10 Claims, 5 Drawing Sheets

(51) Int. Cl.
*G02F 1/1334* (2006.01)
*G02F 1/1335* (2006.01)

(56) References Cited

FOREIGN PATENT DOCUMENTS

| | | | | | |
|---|---|---|---|---|---|
| DE | 69936737 | T2 | | 4/2008 | |
| DE | 112021003805 | T5 | * | 5/2023 | ........... B32B 27/306 |
| DE | 102021134279 | A1 | | 6/2023 | |
| DE | 102022106010 | A1 | | 7/2023 | |
| DE | 202023103995 | U1 | | 7/2023 | |
| WO | WO-2015104702 | A1 | * | 7/2015 | ............ F24S 30/455 |
| WO | WO-2018178824 | A1 | * | 10/2018 | ....... B32B 17/10045 |

* cited by examiner

VEHICLE GLAZING ARRANGEMENT

CROSS-REFERENCE TO RELATED APPLICATION(S)

This application claims the benefit of German patent application no. 10 2023 130 053.9 filed on Oct. 31, 2023, which is incorporated herein by reference in its entirety.

TECHNICAL FIELD

The present disclosure relates to a glazing arrangement which comprises layers having different pigment concentrations. The present disclosure further relates to a vehicle having such a glazing arrangement.

BACKGROUND

Laminated glazing in the automotive sector is equipped with actively switchable layers. These switchable layers are incorporated by lamination and may assist with darkening the vehicle interior. The layers used let through light to differing degrees depending on the transmittance.

SUMMARY

It is desirable to specify a glazing arrangement for a vehicle that allows more efficient darkening of the vehicle interior and so increases the comfort. It is desirable, moreover, to specify a vehicle having such a glazing arrangement.

According to one embodiment, a glazing arrangement for a vehicle comprises a first glazing element, which has a first main face and has a second main face which is opposite the first main face along a stacking direction. The glazing arrangement comprises further a second glazing element, which has a third main face and has a fourth main face which is opposite the third main face along the stacking direction, the second glazing element being coupled with the first glazing element. The glazing arrangement further comprises a switchable interlayer, which is arranged in stacking direction between the first glazing element and the second glazing element. The glazing arrangement further comprises a first plastics layer having a first thickness along the stacking direction and a first pigment concentration, the first plastics layer being arranged between the first glazing element and the interlayer, and a second plastics layer having a second thickness along the stacking direction and a second pigment concentration, the second plastics layer being arranged between the second glazing element and the interlayer, and wherein the first pigment concentration is higher than the second pigment concentration.

The first, second, third and fourth main faces each have a greater extent than side faces, oriented transversely thereto, of the first and second glazing elements. The first glazing element stretches with a sheetlike extent and has a significantly greater extent along the first and second main faces than transversely thereto. The second glazing element stretches with a sheetlike extent and has a significantly greater extent along the third and fourth main faces than transversely thereto. The first and second glazing elements are arranged in accordance with the stacking direction in such a way that the third main face and the second main face are oriented to one another.

The stacking direction is defined such that it points, starting from a side of the glazing arrangement outside the vehicle, to a side of the glazing arrangement inside the vehicle. The stacking direction points, for example, from the first main face to the fourth main face. The region on the side of the glazing arrangement that is situated inside the vehicle is also referred to as the vehicle interior.

The first glazing element may, as the outer glazing, form the outermost element which borders the exterior when installed, for example, in a vehicle roof of a vehicle. Alternatively, one or more elements may cover the first glazing element from above, so that said element, rather than realizing the outermost element, faces the exterior in comparison to the second glazing element or the switchable interlayer. Accordingly, the second glazing element, as the inner glazing, may form the innermost element which co-limits the vehicle interior when installed in a vehicle roof of a vehicle. Alternatively, one or more elements may cover the second glazing element from below, so that said element, rather than realizing the innermost element, faces the vehicle interior in comparison to the first glazing element.

The plastics layers between the two glazing elements serve as a hotmelt adhesive layer for connecting the first glazing element and the second glazing element to one another.

The switchable interlayer may be implemented as a passively or actively switchable interlayer. The actively switchable interlayers include, for example, electrochromic glass (EC), liquid-crystal glass (LC), polymer-dispersed liquid-crystal glass (PDLC) and glasses with a suspended-particle composition (SPD). Thermochromic and photochromic glasses, for example, are part of the group of passively switchable interlayers. The glazing arrangement is not confined to glass panes and comprises, for example, plastic panes.

A switchable interlayer allows adjustment of the translucency through the interlayer and hence of translucency through the entire glazing arrangement.

On the main faces there may be additional layers provided in order, for example, to improve the darkening or to realize other functions, such as temperature regulation in the vehicle interior or improvement of the visual appearance, for example.

According to at least one embodiment, the first thickness of the first plastics layer is lower than the second thickness of the second plastics layer.

According to at least one embodiment, the switchable interlayer is embodied as a switchable film of polymer-dispersed liquid crystals or comprises such a material.

The switchable interlayer is, for example, an actively switchable film which is formed of a suspended-particle composition (SPD for suspended particle device) and/or of an electrochromic layer (EC) and/or of a liquid crystal (LC) and/or of polymer-dispersed liquid crystals (PDLC), or comprises such a material.

A glazing arrangement with a switchable film composed, for example, of polymer-dispersed liquid crystals (PDLC) is part of the group referred to as intelligent glazing systems, which require power for switching on and off. In the ON state, a low-voltage is applied and the molecules adopt an orientation such that light from the spectrum visible to the human eye, also called visible light, is able to pass directly through and the glazing becomes transparent to the human eye. In the OFF state, the power is switched off and the molecules scatter again randomly, and so the passage of light is interrupted and, correspondingly, the glazing is made obscure to the human eye. The passage of UV light with a wavelength in the range from 280 nm to 380 nm and IR light with a wavelength in the range from 700 nm to 1000 nm through the glazing is likewise at least partly interrupted.

The degree of the transparency can be controlled through the applied voltage. This is possible because at lower voltages, only few of the liquid crystals undergo complete orientation in the electrical field, and so only a small part of the light is let through, while the majority of the light is scattered. Furthermore, the degree of the transparency, especially in the ON state, is dependent on the nature of the switchable interlayer.

According to at least one embodiment, the first plastics layer and/or the second plastics layer is embodied as a layer of polyvinyl butyral or comprises such a material.

The switchable interlayer is, for example, embedded into the plastics layer, which is made, for example, of polyvinyl butyral (PVB) and/or ethylene-vinyl acetate (EVA) and/or thermoplastic polyolefin (TPO) and/or polyolefin (PO) and/or thermoplastic polyurethane (TPU) or comprises such a material.

Polyvinyl butyral (PVB) can be used in different colourations. For example, dark-coloured polyvinyl (PVB) is used. Dark-coloured PVB has a black or dark grey colouration, for example. Dark PVB is needed in order to adjust the transmittance for visible light through a glazing arrangement to a defined level.

According to at least one embodiment, the glazing arrangement has a value for the transmittance for visible light of 3% to 12%.

The transmittance for visible light according to ISO 13837:2021 is situated in a range of values from 3% to 12% for the overall glazing arrangement in the ON state. The lower limit of 3% and the upper limit of 12% are encompassed within the range of values. The transmittance for visible light according to ISO 13837:2021 is situated in a range of values from 0% to 10% for the overall glazing arrangement in the OFF state. The lower limit of 0% in the upper limit of 10% are encompassed within the range of values. Dark PVB is used under and over the PDLC layer, which is white, for example, in order to obtain a dark-grey appearance of the glazing arrangement both from the vehicle interior and from outside the vehicle, thereby improving the visual appearance of the vehicle. Alternatively or additionally, the dark PVB may also be used for other switchable layers. For example, for switchable layers with a suspended-particle composition and/or with an electrochromic layer and/or layers with liquid crystals. In these cases, the transmittance for visible light may possess higher values than for polymer-dispersed liquid crystals.

In the case of a symmetrical structure of a glazing arrangement, it is necessary for each plastics layer to comprise, respectively, a dark PVB having a transmittance for visible light in a range of values from 20% to 40%, in order to achieve a transmittance for visible light of around 3% to 12% for the overall glazing arrangement. PVB layers having a transmittance at this level are less UV-resistant than PVB layers having a lower transmittance. As a result of the relatively low first thickness, the concentration of the pigments in the thinner layer is higher. This enables a higher UV resistance.

To achieve better UV resistance, an asymmetrical structure of the glazing arrangement is used, in which the first plastics layer has a higher pigment concentration than the second plastics layer, whereas both plastics layers have a similar transmittance. Similar in this context means that the transmittances of the two plastics layers are the same apart from tolerances and slight deviations. Reducing the thickness of the first plastics layer increases the pigment concentration and hence the UV resistance.

Therefore, relative to a glazing arrangement with a symmetrical structure, the glazing arrangement affords the advantage that the glazing arrangement has a higher UV resistance for the same transmittance of the overall glazing arrangement. In particular, the first plastics layer has a higher UV resistance. An increased UV resistance is accompanied by a longer life of the material and, correspondingly, of the layers.

Furthermore, the polyvinyl butyral (PVB), for example, strengthens the coupling between the first glazing element and the second glazing element. The two glazing elements therefore form a monolithic structure. In physical terms, therefore, the two glazing elements are one pane, which is relevant with regard to aggressive forces in the event of movements in operation, for example. Oppositional displacement of the first and second glazing elements is therefore prevented.

According to at least one embodiment, an infrared ray-reflecting coating is applied on the second main face.

The light radiation is able accordingly to pass through the first glazing element and the underlying layers and elements, but the thermal radiation is reflected to the exterior. The reflected heat therefore reduces the heat input in the vehicle interior. As a result, a lightness corresponding to daylight is enabled in the vehicle interior, while the vehicle interior is less greatly warmed by the thermal radiation in the sunlight. The infrared ray-reflecting coating is formed of silver, for example, or comprises such a material.

The first glazing element is, for example, a translucent glass pane, to allow the infrared ray-reflecting coating to be utilized on the second main face and to reflect the infrared radiation. Alternatively or additionally, the second glazing element is also a translucent glass pane, to obtain similar bending characteristics to the first glazing element during production in the furnace. The glazing elements may alternatively or additionally be tinted. Alternatively or additionally, polycarbonate and/or polymethyl methacrylate (PMMA) panes are used.

According to at least one embodiment, a wavelength-selective coating with low emissivity is applied on the fourth main face.

The wavelength-selective coating with low emissivity (low E), also called a low-E layer, may be embodied, for example, as a metal oxide layer. The low-E layer reduces the overall energy entering the vehicle interior, by diminishing the emission of energy which is absorbed by the dark PVB and/or glass. An example of material used for the low-E layer is indium tin oxide (ITO). This material reflects infrared radiation, especially infrared radiation lying in a wavelength range above 1400 nm. To increase the transmission and durability of the low-E layer, the silver coating is embedded in oxide layers, for example. In the event of cold outdoor temperatures in the winter, for example, the low-E layer reduces the heat loss due to thermal radiation, thereby saving energy in the operation of the vehicle. In the event of higher outdoor temperatures, such as in summer, for example, the low emission of the absorbed energy of the low-E layer reduces the total transmitted solar energy (TTS) in the vehicle interior.

According to at least one embodiment, the first thickness of the first plastics layer has a value of 0.25 mm to 0.55 mm.

According to at least one embodiment, the second thickness of the second plastics layer has a value of 0.5 mm to 0.85 mm.

The first thickness of the first plastics layer is lower than the second thickness of the second plastics layer. The first thickness for example has a value of 0.25 mm to 0.55 mm.

The range of values for the first thickness encompasses the lower limit of 0.25 mm and the upper limit of 0.55 mm. The second thickness for example has a value of 0.5 mm to 0.85 mm. The range of values for the second thickness encompasses the lower limit of 0.5 mm and the upper limit of 0.85 mm.

According to one embodiment, the second glazing element is a sheetlike light guide element. The light guide element is coupled with a light source and configured to conduct light fed in by the light source and provide it for specified illumination of the vehicle interior.

Owing to the greater thickness of the second plastics layer, the second plastics layer has a lower pigment concentration than the first plastics layer for the same transmittance. This results in higher light intensity, since a light ray is absorbed within the light guide element to less of an extent by the bordering layer than a medium having a higher pigment concentration. This enables more efficient illumination.

According to a further aspect, a vehicle is disclosed. The vehicle has a vehicle opening and a glazing arrangement, fixed in the vehicle opening, according to one of the embodiments described above. The vehicle enables substantially the abovementioned advantages and functions.

The vehicle is a motor vehicle, for example. A passenger car or a lorry, for example. Likewise, comprised are means of public transport, such as buses or trains.

The glazing arrangement is, for example, a cover with a roof window. Alternatively or additionally, the glazing arrangement is, for example, a front window. Alternatively or additionally, the glazing arrangement is, for example, a rear window. Alternatively or additionally, the glazing arrangement is, for example, a side window.

BRIEF DESCRIPTION OF DRAWINGS

Exemplary embodiments of the disclosure are elucidated in more detail below, with reference to the schematic drawings

DETAILED DESCRIPTION

Elements of identical construction and function are labelled with the same reference symbols across all the figures.

In this description, terms such as "top", "bottom", "top side", "bottom side", "inner" and "outer", "front" and "rear" refer to orientations and alignments of the kind illustrated in the figures and customary for a motor vehicle ready for operation.

Figure 1:
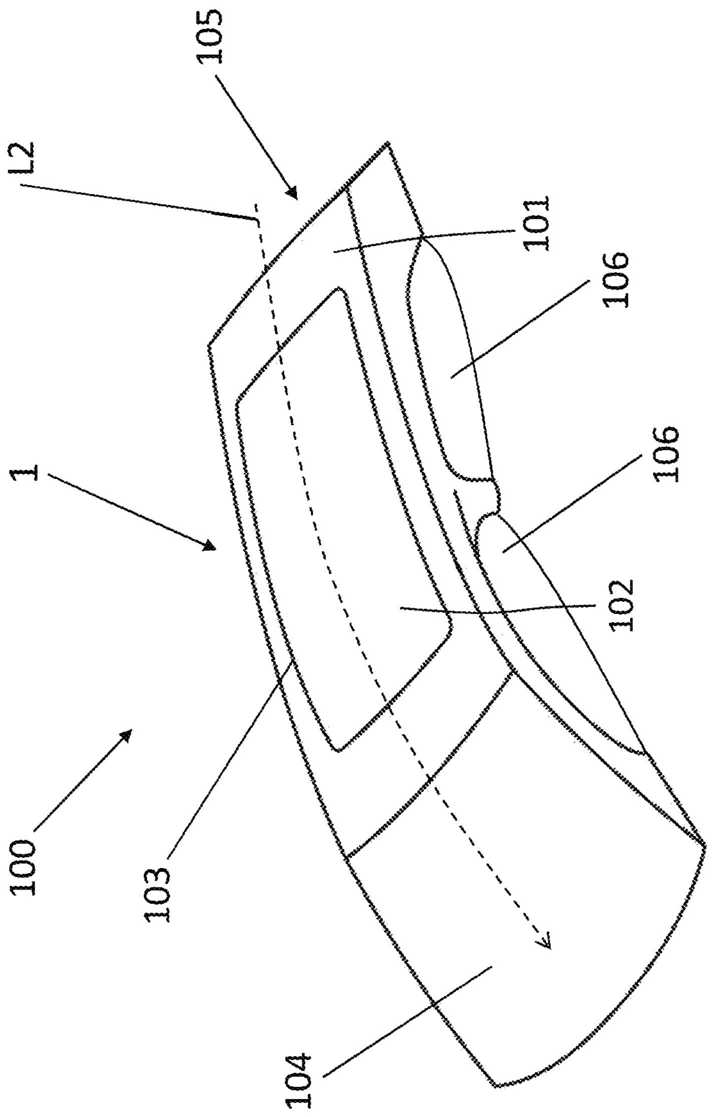
FIG. 1 shows a schematic representation of a part of a vehicle according to one exemplary embodiment.

FIG. 1 shows a glazing arrangement 1 for a vehicle 100, said arrangement realizing, for example, a cover 102 in a vehicle roof 101, which is embodied to close a vehicle opening 103 in the vehicle roof 101. The glazing arrangement 1 may form a part or portion of the cover 102 or alternatively may realize it entirely. The glazing arrangement 1 is configured, for example, as a glass cover or as a cover composed of plastic or another commonplace material. Furthermore, the glazing arrangement 1 may for example form a part or portion of a front window 104, a rear window 105 or a side window 106, or alternatively realize them entirely. A vehicle length direction L2 stretches from the rear window 105 to the front window 104.

Figure 2:
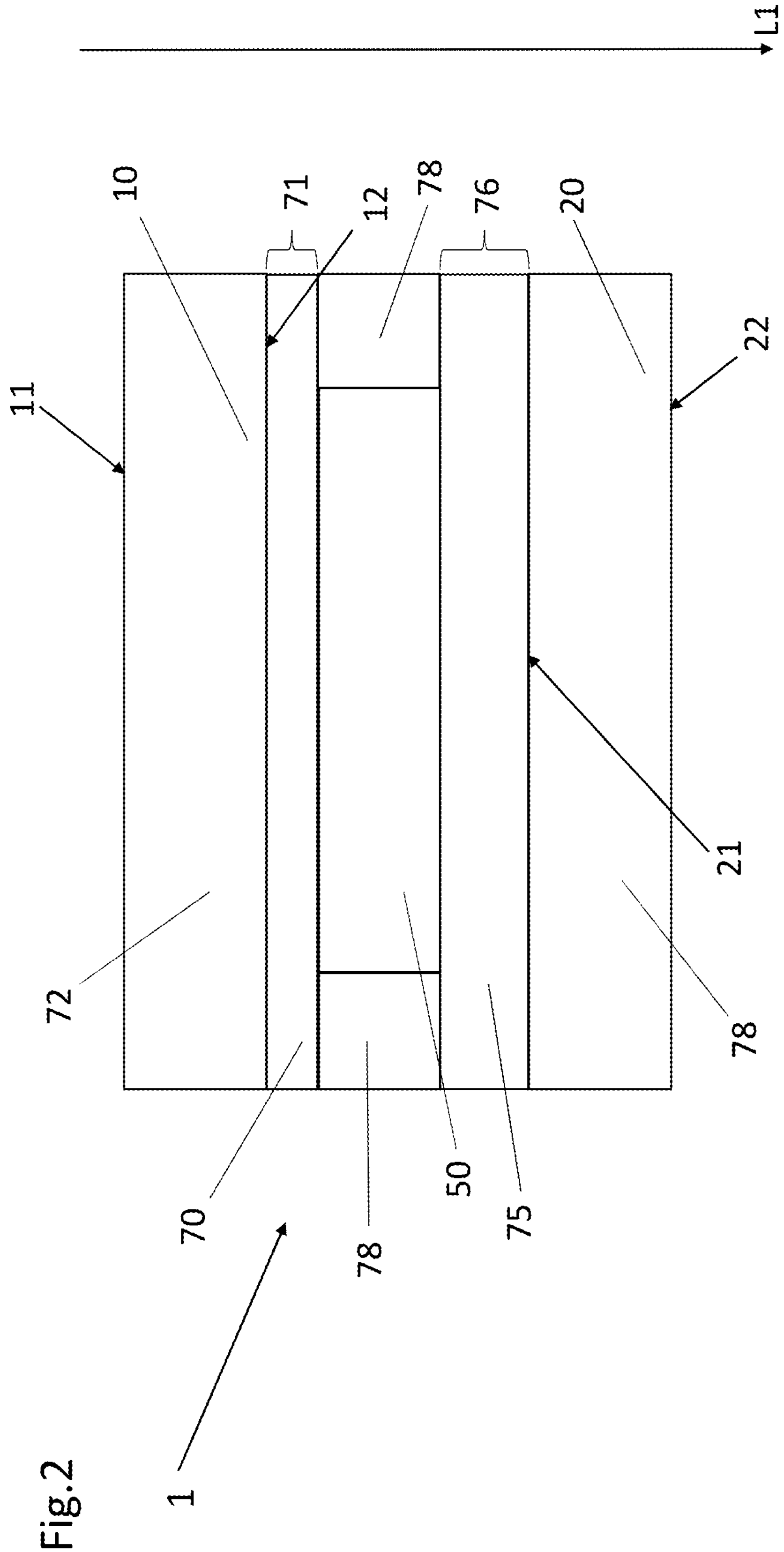
FIG. 2 shows a schematic representation of one exemplary embodiment of a glazing arrangement.

FIG. 2 shows an exemplary embodiment of the glazing arrangement 1 in a schematic sectional view. Along a stacking direction L1, the glazing arrangement 1 first comprises a first glazing element 10. In the operationally ready state, the first glazing element 10 is arranged facing outward and facing away from an interior of the vehicle 100. The first glazing element 10 has a first main face 11 and an opposite second main face 12. In the operationally ready state, the first main face 11 is facing outward. In the operationally ready state, the second main face 12 faces the interior of the vehicle 100. In particular, the second main face 12 is arranged opposite the first main face 11 along the stacking direction L1. The glazing arrangement 1 comprises a second glazing element 20. The second glazing element 20 has a third main face 21 and a fourth main face 22. The third main face 21 is facing the first glazing element 10. The fourth main face 22 is arranged opposite the third main face 21 along the stacking direction L1. Corresponding to the stacking direction L1, the first glazing element 10 and the second glazing element 20 are arranged in such a way that the third main face 21 and the second main face 12 are oriented to one another.

The four main faces 11, 12, 21 and 22 are arranged in the same direction and at a distance from one another. Within customary tolerances, in particular, the four main faces 11, 12, 21 and 22 are arranged parallel to one another.

The first glazing element 10 and the second glazing element 20 are, in particular, translucent glass panes. Alternatively or additionally, the glazing elements 10 and 20 may be tinted. Alternatively or additionally, polycarbonate and/or polymethyl methacrylate (PMMA) panes are used.

Arranged along the stacking direction L1 first is the first glazing element 10, subsequently a first plastics layer 70, subsequently a switchable interlayer 50, and subsequently in turn a second plastics layer 75. Arranged subsequently in turn along the stacking direction L1 is the second glazing element 20. The first glazing element 10 and the second glazing element 20 are connected to one another by means of the first plastics layer 70 with a first thickness 71 and a first pigment concentration 72, and the second plastics layer 75 with a second thickness 76 and a second pigment concentration 77. The first plastics layer 70 and/or the second plastics layer 75 are embodied for example as layers composed of polyvinyl butyral (PVB) or comprise such a material. The two plastics layers 70 and 75 serve as a hotmelt adhesive layer for connecting the first glazing element 10 and the second glazing element 20 to one another. Arranged around the switchable interlayer 50 is a frame 78. The frame 78 is located along the stacking direction L1 between the first glazing element 10 and the second glazing element 20. The dimensions of the switchable interlayer 50 are smaller than the dimensions of the two glazing elements 10 and 20. Accordingly, the switchable interlayer 50 does not reach to the edge of the two glazing elements 10 and 20. In order to avoid a difference in height along the glazing arrangement 1 at the edge of the glazing elements 10 and 20, there is a frame 78. This frame 78 may comprise the same material as the two plastics layers 70 and 75. The frame 78 is formed, for example, of polyvinyl butyral (PVB) and/or ethylene-vinyl acetate (EVA) and/or thermoplastic polyolefin (TPO) and/or polyolefin (PO) and/ or thermoplastic polyurethane (TPU) or comprises such a material. The optical properties of the frame 78 play a minor part, since the frame 78 is hidden by the dark colouration at the edge of the glazing elements 10 and 20 and therefore is not visible. The first thickness 71 of the first plastics layer 70 is lower than the second thickness 76 of the second plastics layer 75. The first thickness 71 has a value, for example, of 0.25 mm to 0.55 mm. The range of values for the first thickness 71 encompasses the lower limit of 0.25 mm and the upper limit of 0.55 mm. The second thickness 76 has a value, for example, of 0.5 mm to 0.85 mm. The range of values for the second thickness 76 encompasses the lower limit of 0.5 mm and the upper limit of 0.85 mm. Polyvinyl butyral (PVB) can be used in different colourations. For a similar translucency, the first pigment concentration 72 in the thinner first plastics layer 70 is higher than the second pigment concentration 77 in the thicker second plastics layer 75. Because of the lower first thickness 76, the concentration of the pigments in the first plastics layer 70 is higher, and so the first plastics layer 70 achieves a higher UV resistance and so enables a longer lifetime for the glazing arrangement 1. In FIG. 2, the two plastics layers 70 and 75 composed, for example, of dark polyvinyl butyral are used and are arranged over and under the switchable interlayer 50, which comprises a white PDLC layer, for example. In this way, a dark-grey appearance of the overall glazing arrangement 1 is achieved both from the vehicle interior and from outside the vehicle 100, thereby improving the visual appearance.

Embedded between the two plastics layers 70 and 75 is the switchable interlayer 50. The switchable interlayer 50 is formed, for example, of a suspended-particle composition (SPD for suspended particle device) and/or of a liquid crystal (LC) and/or of polymer-dispersed liquid crystals (PDLC), or comprises such a material. The switchable interlayer 50 therefore constitutes a shading apparatus 50 which affords the possibility of darkening the vehicle interior in a comfortable way and/or modifying the transmission of light through the glazing arrangement 1 by greater light scattering, for example.

Figure 3:
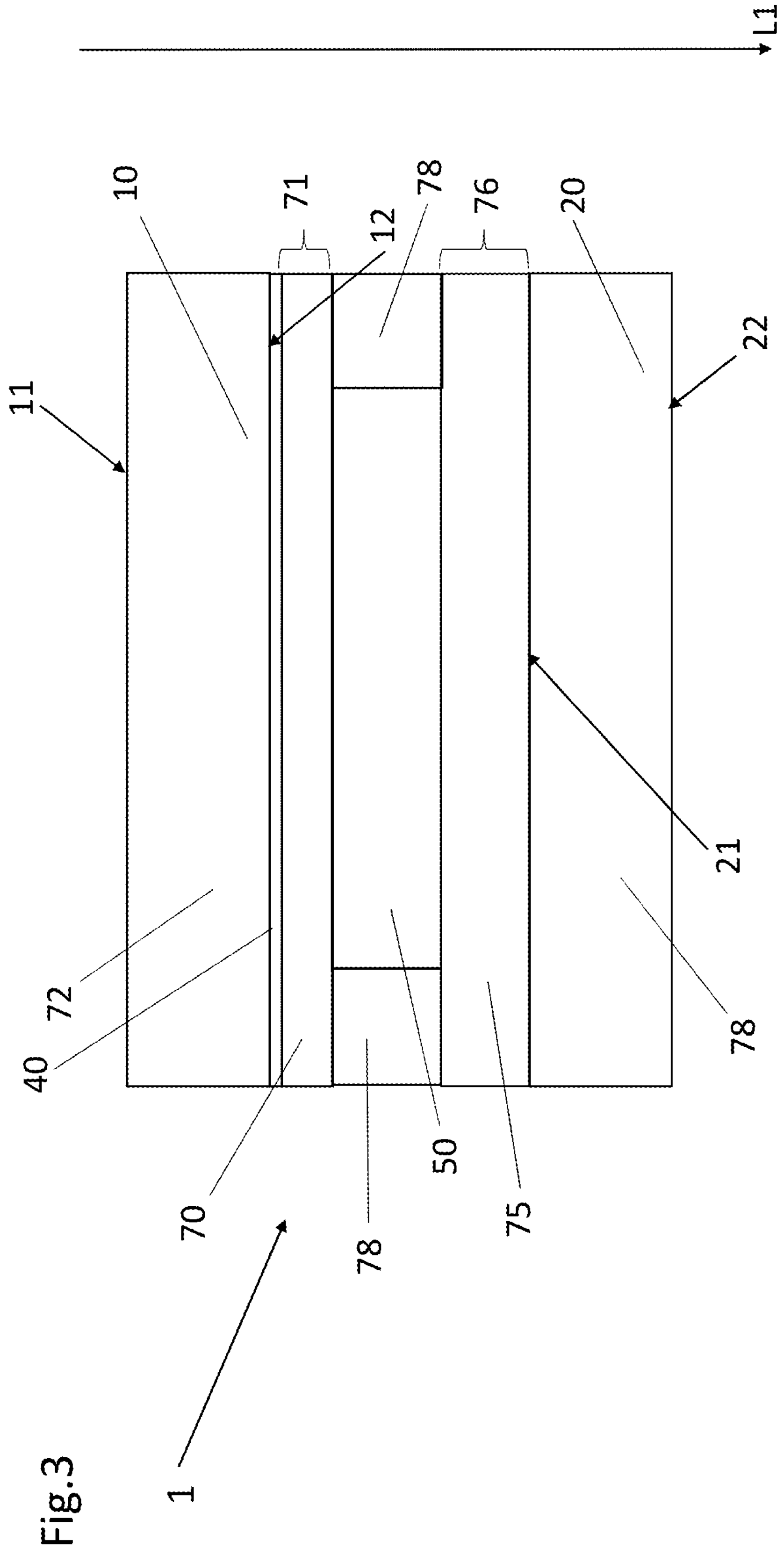
FIG. 3 shows a schematic representation of a further exemplary embodiment of a glazing arrangement.

FIG. 3 shows a further exemplary embodiment of the glazing arrangement 1 in a schematic sectional view. The glazing arrangement 1 is the same as in FIG. 2, with the difference that an infrared ray-reflecting coating 40 is applied on the second main face 12. The light radiation is therefore able to pass through the first glazing element 10 and the underlying layers and elements. The thermal radiation is reflected by the infrared ray-reflecting coating 40 and reflected to the exterior. The reflected heat therefore reduces the heat input in the vehicle interior.

The first glazing element 10 is, for example, a translucent glass pane, to allow the infrared ray-reflecting coating 40 to be utilized on the second main face 12 and to reflect the infrared radiation. Alternatively or additionally, the second glazing element 20 is also a translucent glass pane, to produce bending characteristics similar to those of the first glazing element 10 during production in the furnace. The glazing elements 10 and 20 may alternatively or additionally be tinted. Alternatively or additionally, polycarbonate and/or polymethyl methacrylate (PMMA) panes are used.

Figure 4:
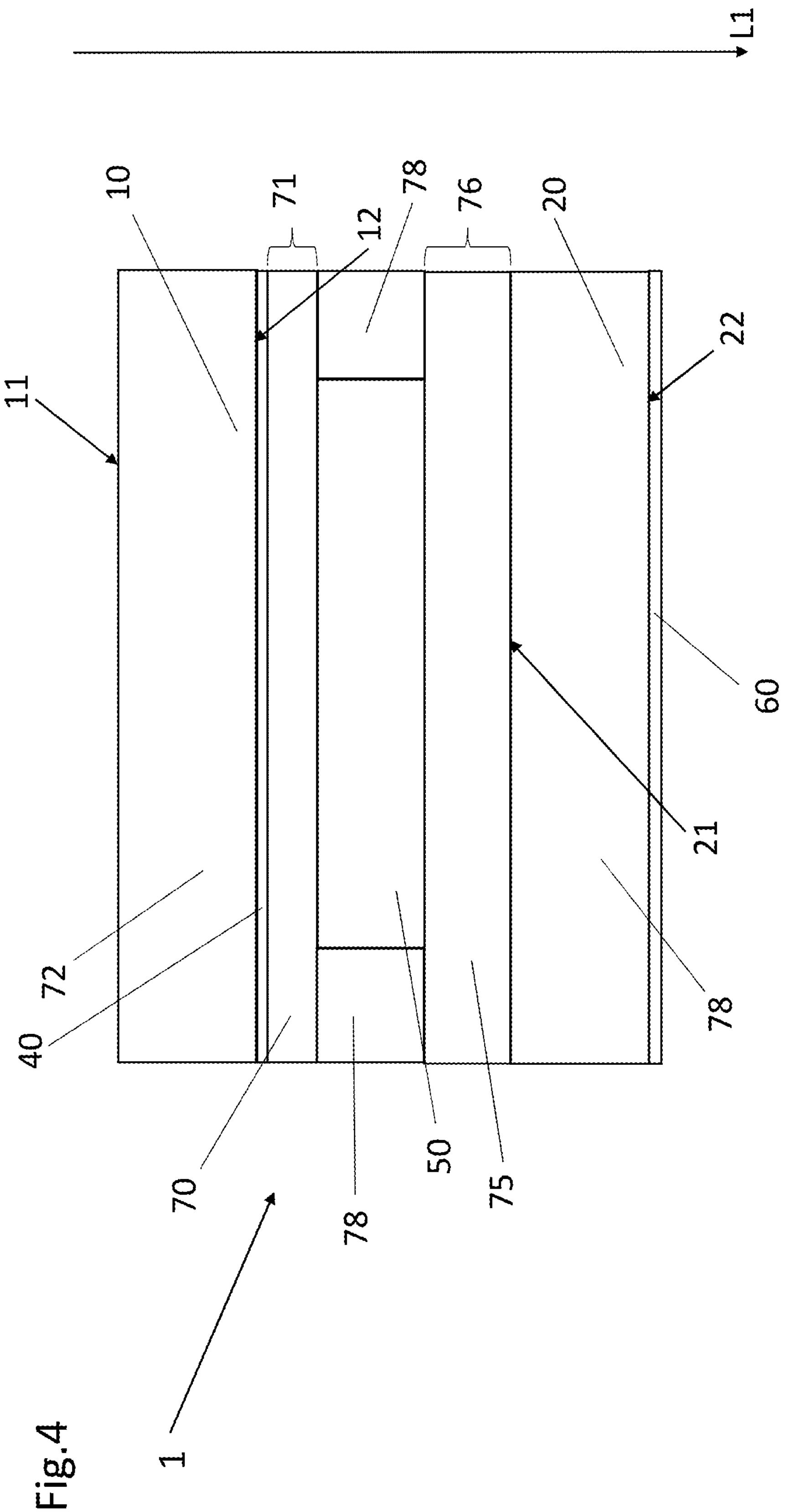
FIG. 4 shows a schematic representation of a further exemplary embodiment of a glazing arrangement.

FIG. 4 shows a further exemplary embodiment of the glazing arrangement 1 in a schematic sectional view. The glazing arrangement 1 is the same as in FIG. 3, with the difference that a wavelength-selective coating of low emissivity (low E) 60 is applied on the fourth main face 22. The wavelength-selective coating with low emissivity 60, also called low-E layer, is embodied for example as a metal oxide layer or comprises such a material. A layer of indium tin oxide is used for example as material for the low-E layer 60. The low-E layer 60 may be applied additionally or alternatively to the infrared ray-reflecting coating 40. It is possible to apply only a low-E layer 60, without the infrared ray-reflecting coating 40 on the glazing arrangement 1.

Figure 5:
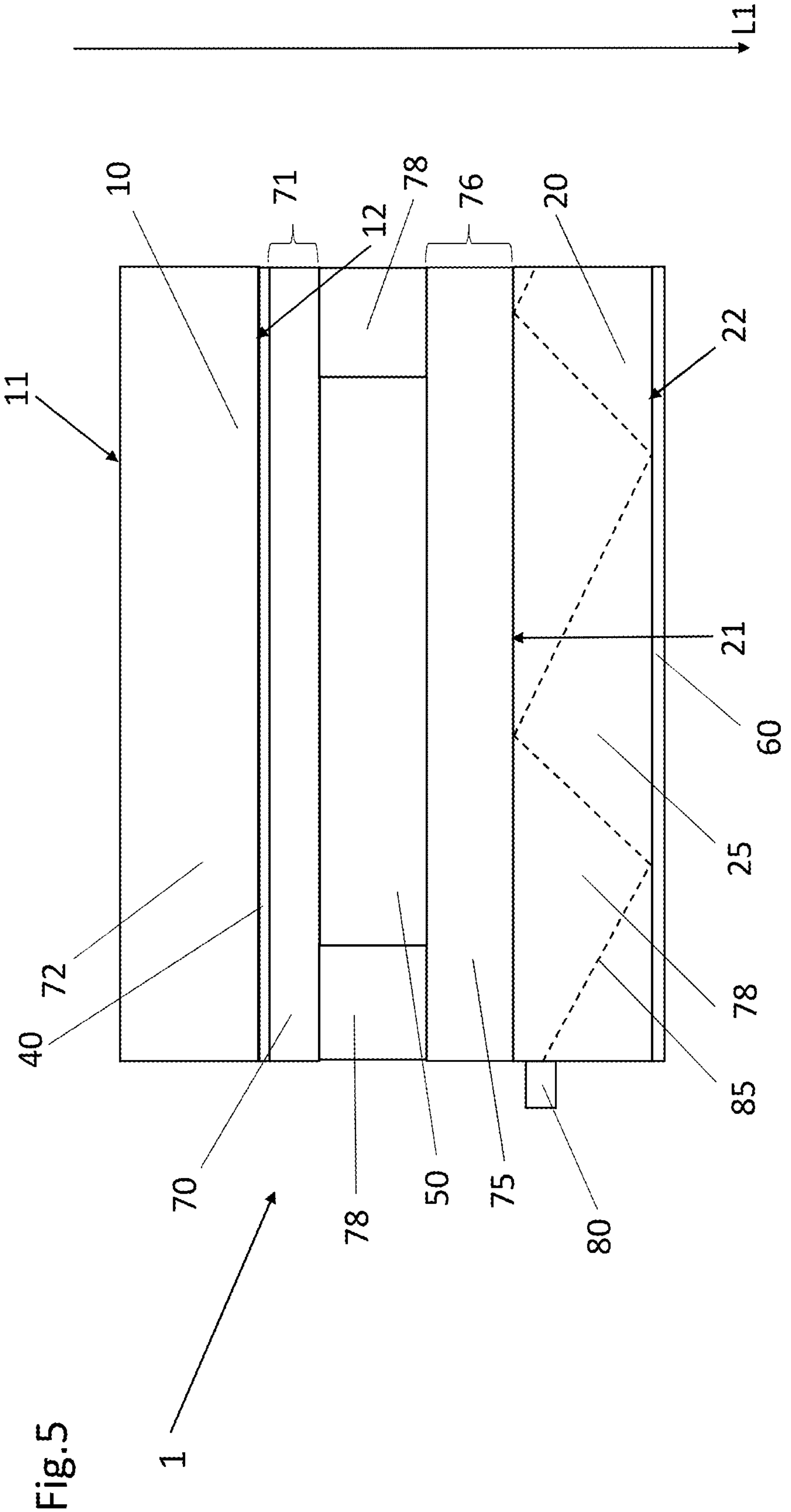
FIG. 5 shows a schematic representation of a further exemplary embodiment of a glazing arrangement.

FIG. 5 shows a further exemplary embodiment of the glazing arrangement 1 in a schematic sectional view. The glazing arrangement 1 is the same as in FIG. 4, with the difference that the second glazing element 20 is used as a sheetlike light guide element 25. The light guide element 25 used is, for example, a translucent glass pane, such as white glass or clear glass. Alternatively or additionally, a translucent plastics pane may be used. The light guide element 25 is coupled to a light source 80. The light guide element 25 can conduct light fed in from the light source 80. In FIG. 5, the light is represented illustratively on the basis of an individual light ray 85, which is shown as a dashed line. This ensures specified illumination of the vehicle interior.

The use of the second plastics layer 75, which borders the second glazing element 20, leads to a higher light intensity, since the light ray 85 within the light guide element 25 is absorbed to less of an extent by the bordering second plastics layer 75 than by a medium having a higher pigment concentration. The combination of the second plastics layer 75 and the light guide element 25 synergistically improves the efficiency of the illumination of the vehicle interior.

The light guide element 25 and the light source 80 may be applied additionally or alternatively to the infrared ray-reflecting coating 40 and/or the metal oxide layer 50. Every combination of the infrared ray-reflecting coating 40, the metal oxide layer 60 and the light guide element 25 with the light source 80 is possible. The glazing arrangement 1 may also comprise only the light guide element 25 with the light source 80, without the infrared ray-reflecting coating 40 and the metal oxide layer 60.

In the interests of clarity and comprehensibility, the proportions of the individual components do not correspond to the true proportions of the glazing arrangement 1.

LIST OF REFERENCE SYMBOLS

1 Glazing arrangement
10 First glazing element
11 First main face
12 Second main face
20 Second glazing element
21 Third main face
22 Fourth main face
25 Light guide element
40 Infrared ray-reflective coating
50 Switchable interlayer
60 Wavelength-selective coating
70 First plastics layer
71 First thickness
72 First pigment concentration
75 Second plastics layer
76 Second thickness
77 Second pigment concentration
78 Frame
80 Light source
85 Light ray
100 Vehicle
101 Vehicle roof
102 Cover
103 Vehicle opening
104 Front window
105 Rear window

106 Side window
L1 Stacking direction
L2 Vehicle length direction.

The invention claimed is:

1. A glazing arrangement for a vehicle, comprising:

a first glazing element which has a first main face and has a second main face which is opposite the first main face along a stacking direction, a second glazing element, which has a third main face and has a fourth main face which is opposite the third main face along the stacking direction, the second glazing element being coupled with the first glazing element, a switchable interlayer, which is arranged in stacking direction between the first glazing element and the second glazing element, a first plastics layer having a first thickness along the stacking direction and a first pigment concentration, the first plastics layer being arranged between the first glazing element and the interlayer, and a second plastics layer having a second thickness along the stacking direction and a second pigment concentration, the second plastics layer being arranged between the second glazing element and the interlayer, wherein the first pigment concentration is higher than the second pigment concentration wherein the first thickness is lower than the second thickness, and wherein for a similar translucency between the first and second plastics layer, the first pigment concentration in the thinner first plastics layer is higher than the second pigment concentration in the thicker second plastics layer.

2. The glazing arrangement according to claim 1, wherein the switchable interlayer is embodied as a switchable film of polymer-dispersed liquid crystals or comprises such a material.

3. The glazing arrangement according to claim 1, wherein the first plastics layer and/or the second plastics layer are/is embodied as a layer of polyvinyl butyral or comprise such a material.

4. The glazing arrangement according to claim 1, wherein the glazing arrangement has a value for the transmittance for visible light of 3% to 12%.

5. The glazing arrangement according to claim 1, wherein an infrared ray-reflective coating is applied on the second main face.

6. The glazing arrangement according to claim 1, wherein a wavelength-selective coating with low emissivity is applied on the fourth main face.

7. The glazing arrangement according to claim 1, wherein the first thickness has a value of 0.25 mm to 0.55 mm.

8. The glazing arrangement according to claim 1, wherein the second thickness has a value of 0.5 mm to 0.85 mm.

9. The glazing arrangement according to claim 1, wherein the second glazing element is a sheetlike light guide element, the light guide element being coupled with a light source, and the light guide element being configured to conduct light fed in from the light source and provide it for specified illumination of the vehicle interior.

10. A vehicle, comprising a vehicle opening and, fixed in the vehicle opening, the glazing arrangement according to claim 1.

* * * * *